Sept. 9, 1930.          P. E. KLOPSTEG          1,775,246
                        WEIGHING BALANCE
                     Filed Aug. 30, 1928

Inventor:
Paul E. Klopsteg
By Gillson, Mann & Cox, Attys.

Patented Sept. 9, 1930

1,775,246

UNITED STATES PATENT OFFICE

PAUL E. KLOPSTEG, OF CHICAGO, ILLINOIS, ASSIGNOR TO CENTRAL SCIENTIFIC COMPANY, OF CHICAGO, ILLINOIS, A CORPORATION OF ILLINOIS

WEIGHING BALANCE

Application filed August 30, 1928. Serial No. 302,909.

This invention relates to balances, and has for its principal object to provide an improved structure by which weighing can be accomplished more easily and quickly than with the devices in common use.

Figure 1:
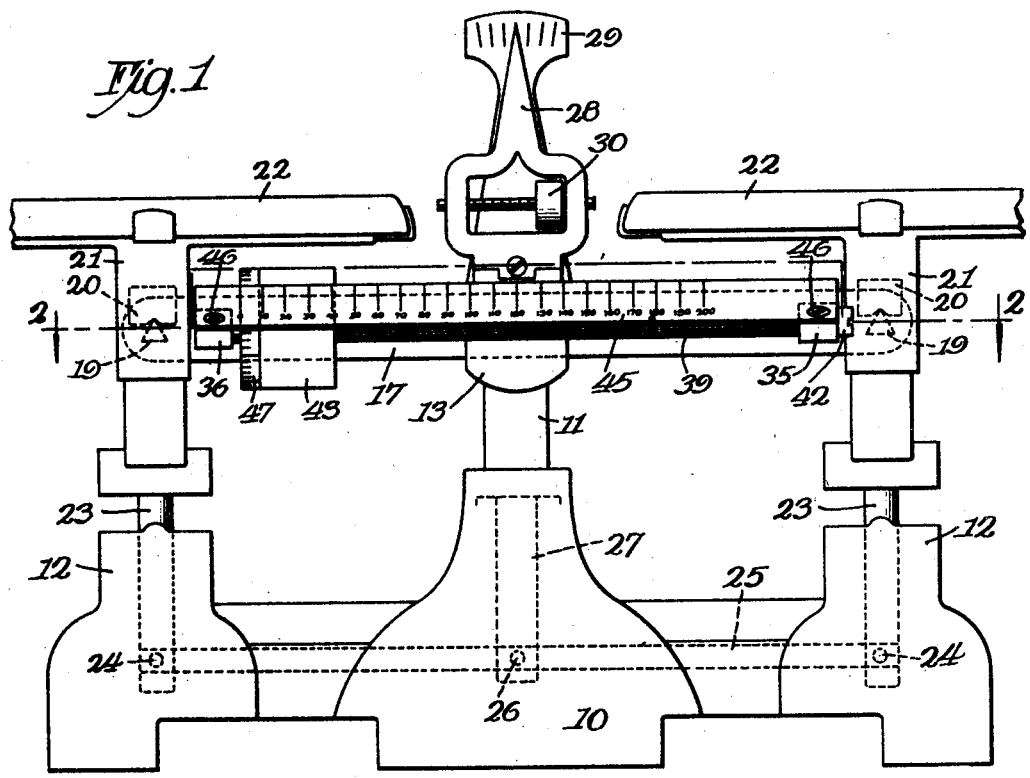
Figure 2:
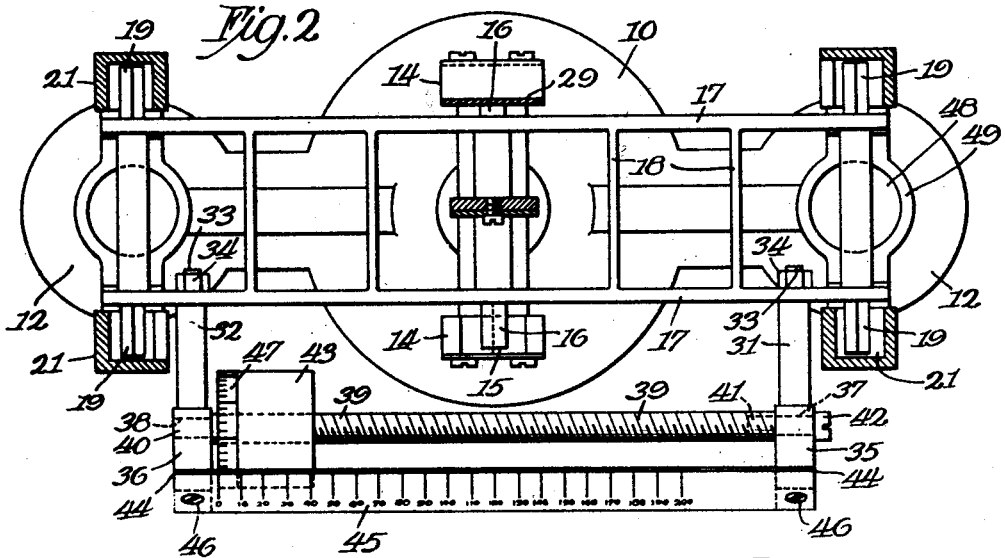

Further objects and advantages of the invention will become apparent as the description is read in connection with the accompanying drawings, in which Fig. 1 is a side elevation of a balance embodying the preferred form of the invention; and Fig. 2 is a plan section taken on the line 2—2 of Fig. 1.

This specific illustration and the correspondingly specific description are, however, used for the purpose of disclosure only, and are not intended to impose limitations on the claims that would permit the substance of the invention to be appropriated without infringement.

The balance includes a stand composed of a base 10, having a central upright column 11 and a hollow abutment 12 at each end.

The column 11 is forked at 13, and each arm 14 thereof is provided with a V-shaped bearing 15 to receive a knife edge trunnion 16, projecting laterally from a beam composed of side members 17 and cross members 18.

Adjacent to each end, the beam also carries other knife edge trunnions 19, which receive V-shaped bearings 20 carried by pan forks 21 fitted with pans 22. Each pan fork has a shank 23 extending through the corresponding hollow abutment 12, and pivoted at 24 to one end of a lever 25, which is fulcrumed at 26 on a stud 27 projecting downwardly from the column 11.

The beam is equipped with a pointer 28, moving along a fixed scale 29 and provided with an adjustable weight 30.

Balances substantially as illustrated and above described are old. In some instances the beam is equipped with a scale and rider. In others it is equipped with an auxiliary split beam, with a pendulum weight for heavy units and a slide for small units. According to this invention these are replaced by an improved scale and counterpoise arrangement.

Brackets 31 and 32 are provided with threaded stems 33 projecting through the side members 17 of the beam and receiving nuts 34. Adjacent to their free ends the brackets are provided with enlarged rectangular portions 35 and 36, equipped with bores 37 and 38. A screw 39 has one end, 40, reduced and fitted in the bore 38, and the other end drilled and tapped at 41 to receive a screw 42, passing through the bore 37. A counterpoise 43 is threaded on the screw and carries a circular scale 47.

The end portions of the brackets are provided with inclined seats 44, to which a main scale 45 is made fast by screws 46.

The screw 39 has a quarter inch pitch, and the scale 45 is provided with quarter inch divisions each of which represent ten grams. The scale 47 has ten main divisions, each representing one gram, and each divided into ten other divisions representing tenths of a gram.

In the arrangement illustrated, the balance indicates zero when the counterpoise is at the extreme left position shown in the drawings. To offset this roughly a quantity of lead or the like, 48, is placed in a receptacle 49, carried by the right pan fork 21, and minute corrections are made with the weight 30.

In use the substance to be weighed is placed on the left pan, the counterpoise 43 screwed toward the left until the pointer 38 indicates zero, when the scales 45 and 47 indicate the weight.

The range of a particular scale may be extended by placing weights on the right pan; and scales may be designed for any particular range or to weigh in any desired units by changing the graduations of the scales 47 and 45, the pitch of the screw, and the diameter of the scale 47.

The improved scale and counterpoise arrangement may be embodied in an attachment suitable for application to existing balances.

I claim as my invention—

1. In a balance of the type including a stand, a beam fulcrumed on the stand, and pans carried by the beam on opposite sides of its fulcrum, the combination of a bracket on the beam adjacent to each end, a screw mounted on the brackets, a main scale parallel with the screw and graduated in divisions corresponding to one turn of the screw, and a counterpoise threaded on the screw and having scale graduations in fractions of the divisions of the main scale.

2. In a balance of the type including a stand, a beam fulcrumed on the stand, and pans carried by the beam on opposite sides of its fulcrum, the combination of a bracket projecting laterally from the beam adjacent to each end and provided with an inclined seat, a screw mounted on the brackets between the seats and the beam, a main scale mounted on the inclined seats, and a counterpoise threaded on the screw and having scale graduations adjacent to the main scale.

3. In a balance of the type including a stand, a beam fulcrumed on the stand, and pans carried by the beam on opposite sides of its fulcrum, the combination of a screw mounted on and extending lengthwise with respect to the beam, a counterpoise threaded on the screw having scale graduations on its periphery, and a graduated scale extending lengthwise to the beam and adjacent to the counterpoise.

4. An attachment for balances of the type including a stand, a beam fulcrumed on the stand, and pans carried by the beam on opposite sides of its fulcrum comprising a pair of brackets adapted to be mounted on the balance beam, a screw carried by and extending between the brackets, a main scale carried by the brackets parallel to the screw and graduated in divisions corresponding to one turn of the screw, and a counterpoise threaded on the screw having circular screw graduations in fractions of the divisions on the main scale.

In testimony whereof I affix my signature.

PAUL E. KLOPSTEG.